United States Patent
Bohne et al.

(10) Patent No.: US 8,805,455 B2
(45) Date of Patent: Aug. 12, 2014

(54) METHOD AND APPARATUS FOR INTRINSICALLY SAFE OPERATION OF A COMMUNICATION DEVICE

(75) Inventors: William C. Bohne, Lawrenceville, GA (US); John W. Oglesbee, Watkinsville, GA (US)

(73) Assignee: Motorola Solutions, Inc., Schaumburgh, IL (US)

( * ) Notice: Subject to any disclaimer, the term of this patent is extended or adjusted under 35 U.S.C. 154(b) by 813 days.

(21) Appl. No.: 12/488,926

(22) Filed: Jun. 22, 2009

(65) Prior Publication Data

US 2010/0323766 A1 Dec. 23, 2010

(51) Int. Cl.
*H04B 1/38* (2006.01)
*H04B 1/04* (2006.01)

(52) U.S. Cl.
CPC .................................... *H04B 1/04* (2013.01)
USPC ........ 455/572; 455/117; 455/217; 455/550.1; 320/136; 429/61; 429/65; 323/276

(58) Field of Classification Search
CPC ........ H04B 1/04; H02J 7/0011; H02J 7/0026; H02J 7/0031; H02J 7/0029
USPC ............... 455/550.1, 117, 217, 572; 320/116, 320/134, 118, 121, 136
See application file for complete search history.

(56) References Cited

U.S. PATENT DOCUMENTS

| | | | |
|---|---|---|---|
| 4,638,396 A | 1/1987 | Mukli et al. | |
| 4,992,340 A | 2/1991 | Tidwell et al. | |
| 5,087,871 A | 2/1992 | Losel | |
| 5,206,538 A * | 4/1993 | Orta | 307/66 |
| 5,218,284 A | 6/1993 | Burns et al. | |
| 5,335,133 A | 8/1994 | Bishop et al. | |
| 5,587,250 A * | 12/1996 | Thomas et al. | 429/3 |
| 6,087,812 A * | 7/2000 | Thomas et al. | 320/141 |
| 6,751,076 B2 | 6/2004 | Lytollis | |
| 6,789,205 B1 | 9/2004 | Patino et al. | |
| 6,859,020 B2 * | 2/2005 | Baldwin et al. | 323/283 |
| 6,902,412 B2 | 6/2005 | Higgins | |
| 7,130,665 B2 | 10/2006 | Pinder | |
| 7,336,978 B2 * | 2/2008 | Kim | 455/574 |

(Continued)

FOREIGN PATENT DOCUMENTS

| CN | 1241341 A | 1/2000 |
|---|---|---|
| CN | 101884151 A | 11/2010 |

(Continued)

OTHER PUBLICATIONS

International Search Report and Written Opinion for International Application No. PCT/US2010/036270 mailed on Aug. 25, 2010.

(Continued)

*Primary Examiner* — Yuwen Pan
*Assistant Examiner* — Fatuma Sherif
(74) *Attorney, Agent, or Firm* — Barbara R. Doutre

(57) ABSTRACT

An intrinsic safety approach is provided for a battery powered communication device. Sparking is prevented at radio contacts during attachment and removal of a battery (104, 204, 304, 404) from a radio (102, 202, 302, 402) through the use of switches (112, 212, 312, 412/424) to isolate the radio capacitors from the radio contacts and/or dissipate energy from the radio capacitor through a discharge resistor (214, 314, 414).

4 Claims, 5 Drawing Sheets

(56) References Cited

U.S. PATENT DOCUMENTS

| | | | |
|---|---|---|---|
| 7,408,755 B1 * | 8/2008 | Ye et al. | 361/93.1 |
| 2004/0024522 A1 * | 2/2004 | Walker et al. | 701/210 |
| 2004/0243444 A1 * | 12/2004 | Steusloff et al. | 705/2 |
| 2005/0048816 A1 | 3/2005 | Higgins | |
| 2006/0238174 A1 * | 10/2006 | Russell et al. | 323/229 |
| 2007/0145827 A1 * | 6/2007 | Paik et al. | 307/43 |
| 2008/0079488 A1 * | 4/2008 | Albrecht et al. | 330/127 |
| 2008/0100976 A1 | 5/2008 | Huczko et al. | |
| 2009/0143111 A1 | 6/2009 | Oglesbee | |

FOREIGN PATENT DOCUMENTS

| | | |
|---|---|---|
| DE | 102005002490 A1 | 7/2006 |
| EP | 0545042 A1 | 6/1993 |
| JP | 06038280 A * | 2/1994 |
| JP | H638280 A | 2/1994 |

OTHER PUBLICATIONS

English Translation of Office Action for counterpart Chinese Patent Application No. 201080027709.0 mailed Sep. 23, 2013.

* cited by examiner

US 8,805,455 B2

METHOD AND APPARATUS FOR INTRINSICALLY SAFE OPERATION OF A COMMUNICATION DEVICE

FIELD OF THE DISCLOSURE

The present disclosure relates generally to a communication devices and more particularly to intrinsically safe operation of such devices.

BACKGROUND

Two-way radios, cell phones, and other handheld communication devices are often used in flammable or potentially explosive areas. Radios intended for hazardous or potentially explosive environments may require "intrinsically safe" type certification through an agency such as Factory Mutual (FM) or be ATEX compliant (from the French—ATmosphere Explosibles) in the European Union. When dealing with battery powered radios, the prevention of sparking at the contacts located between the battery and the radio is necessary to meet intrinsically safe operating requirements.

Certain circuit designs, such as radio pulse transmitters, are of particular concern when dealing with intrinsically safe operation due to the large capacitors required to smooth peak current to the transmitter power amplifier supply as well as filter capacitance for other circuits. Typically, capacitance values of 1000 uF to 5000 uF may be required to accomplish such smoothing and may be distributed throughout the circuit. Large capacitance is problematic in intrinsically safe systems due to: (1) the large amount of energy required to charge the radio capacitance upon attachment (inrush); and (2) the large amount of energy remaining in the capacitance in the radio and exposed at the contacts if the battery is removed from the radio and short circuited. Upon attachment to the radio, the energy in the battery charges this capacitance quickly, creating the potential for a spark to be generated. Likewise, when the battery is removed from the radio, the energy stored in the radio could be rapidly discharged if the radio contacts were to become shorted before the energy could otherwise be dissipated. A spark in a hazardous environment, generated from either of these scenarios, could cause an explosion. None of the currently available approaches to intrinsic safety address the possible short circuit discharge conditions on the exposed radio contacts.

Accordingly, there is a need for an improved intrinsically safe circuit and manner of providing intrinsically safe circuit operation of a battery powered communication device.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method, steps and apparatus components related to intrinsically safe communication devices by preventing sparking at exposed radio contacts during the attachment and removal of a battery from a radio. The prevention of sparking is achieved by using switches to isolate energy stored in radio capacitors from the exposed radio contacts and/or dissipating energy from the radio capacitors.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
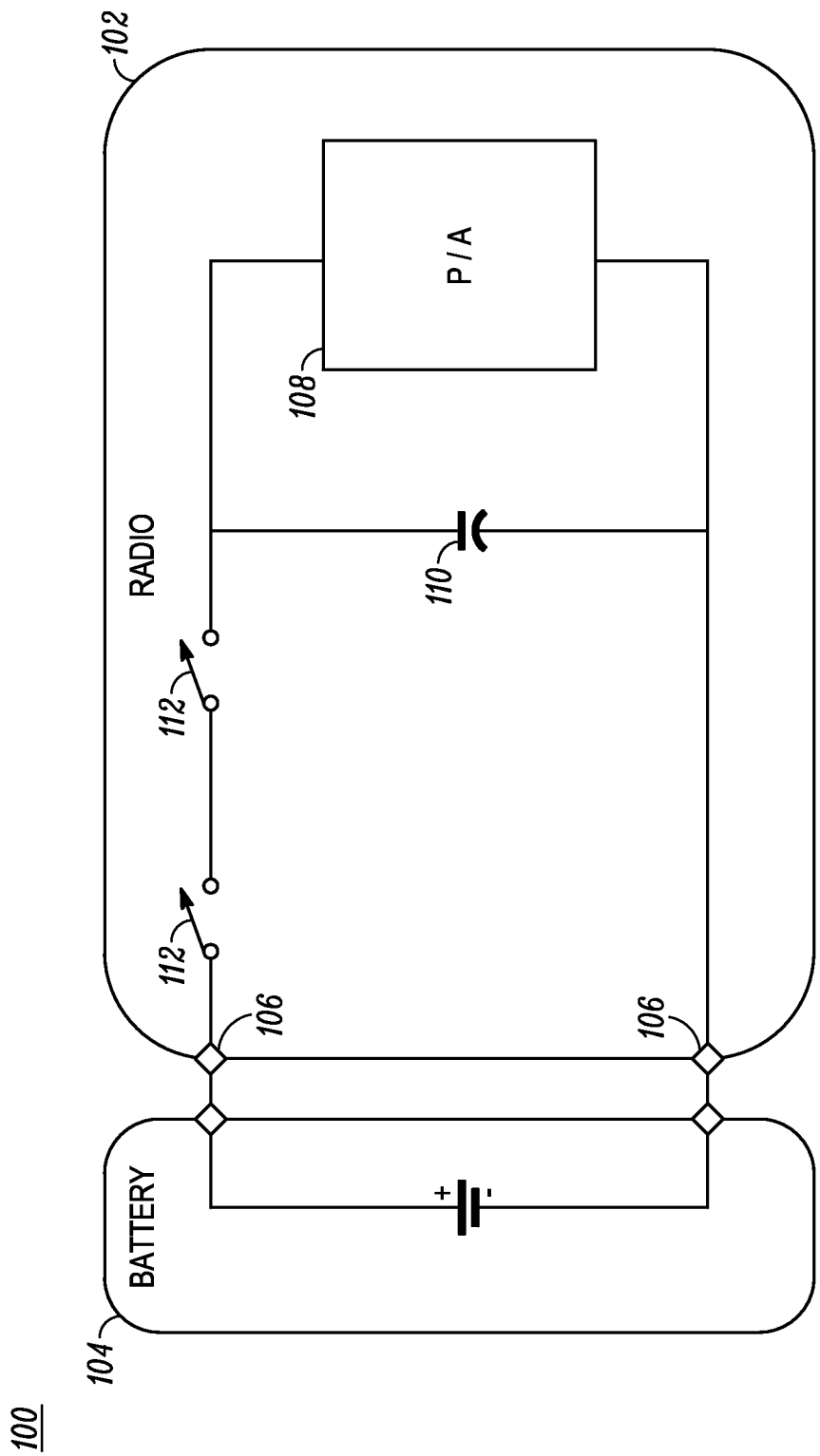
FIG. 1 is a communication device in accordance with various embodiments of the invention.

FIG. 1 is a partial block diagram of a communication device 100 formed in accordance with an embodiment of the invention. Communication device 100 comprises a radio 102 and a battery 104 coupled to the radio via radio contacts 106 (Supply, GND). The radio 102 includes transceiver and controller circuitry, but for the purposes of this application only transmit power amplifier 108 is shown. Transmit power amplifier 108 utilizes a capacitor 110 across the supply and GND lines to smooth out peak currents associated with the power amplifier and/or other circuits within the radio. In accordance with the embodiment, a plurality of switches 112 are coupled to at least one of the radio contacts 106 such that the switches are opened in response to the battery 104 being removed from the radio 102. When opened, switches 112 provide isolation between the radio capacitor 110 and the radio contacts 106. In this embodiment, the plurality of switches are cam operated mechanical switches which open when the battery is removed and close when the battery is attached. For purposes of explanation, the impedance of the switches is not significant. While the plurality of switches 112 is shown as two switches for redundancy purposes, one switch may be used or more than two switches may also be used depending on the application.

Figure 2:
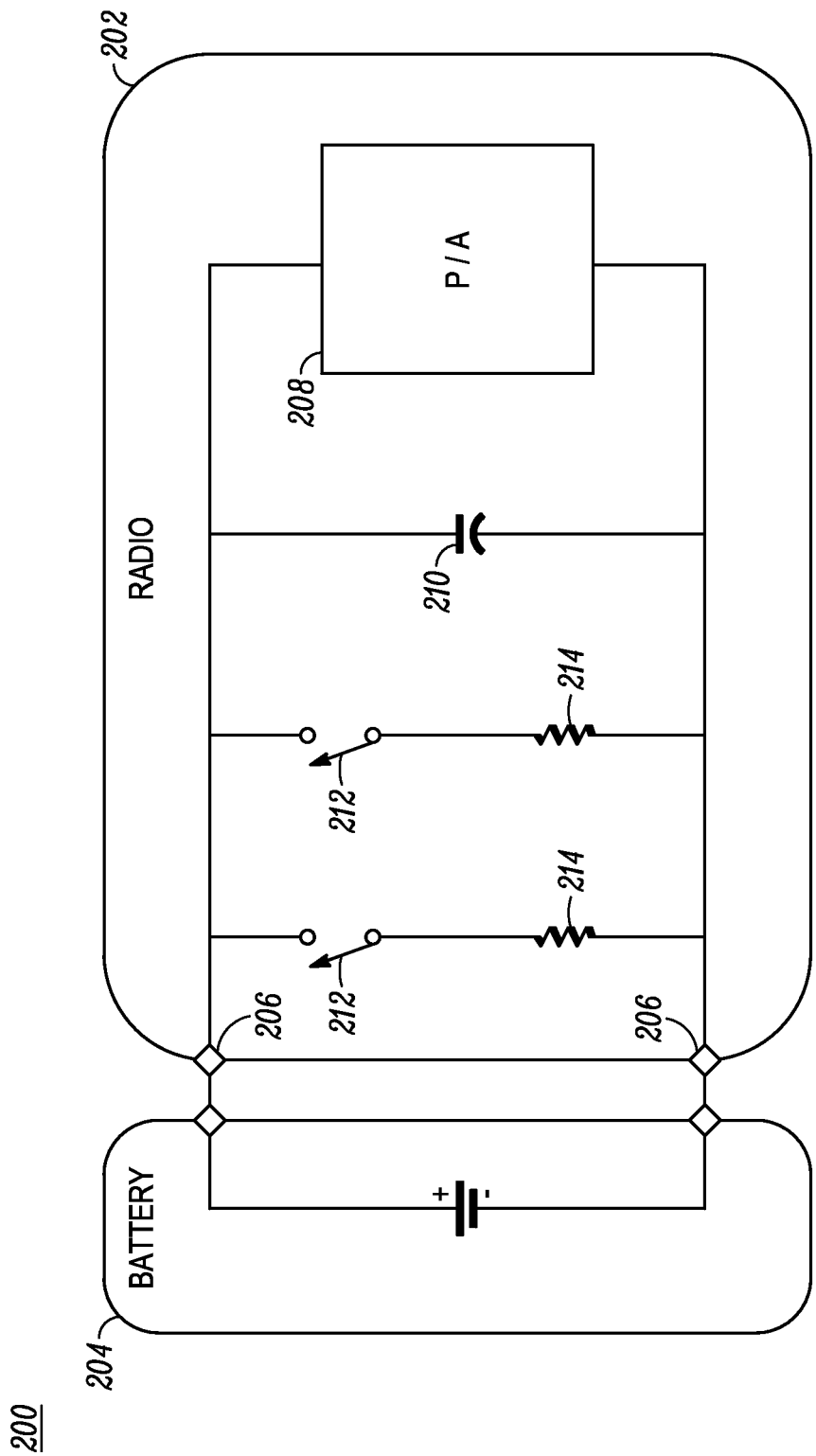
FIG. 2 is a communication device in accordance with various embodiments of the invention.

FIG. 2 shows a block diagram of a communication device 200 in accordance with another embodiment of the invention. Like the communication device of FIG. 1, communication device 200 comprises a radio 202 and a battery 204 coupled to the radio via radio contacts 206. The radio 202 includes known transceiver and controller circuitry, but for the purposes of this application only transmit power amplifier is shown. Transmit power amplifier 208 utilizes a capacitor 210 across the supply lines to smooth out peak currents associated with the power amplifier and/or other circuits. In accordance with this embodiment, a plurality of switches 212 are coupled to at least one of the radio contacts 206 such that at least one switch is used to dissipate energy from the radio capacitor 210 through at least one discharge resistor 214. When switches 212 are closed, discharge resistors 214 become parallel coupled to provide a discharge path between supply and GND. In this embodiment, the plurality of switches 212 comprise parallel coupled cam operated mechanical switches that close when the battery is removed to dissipate energy from the capacitor 210 through the plurality of discharge resistors 214.

Figure 3:
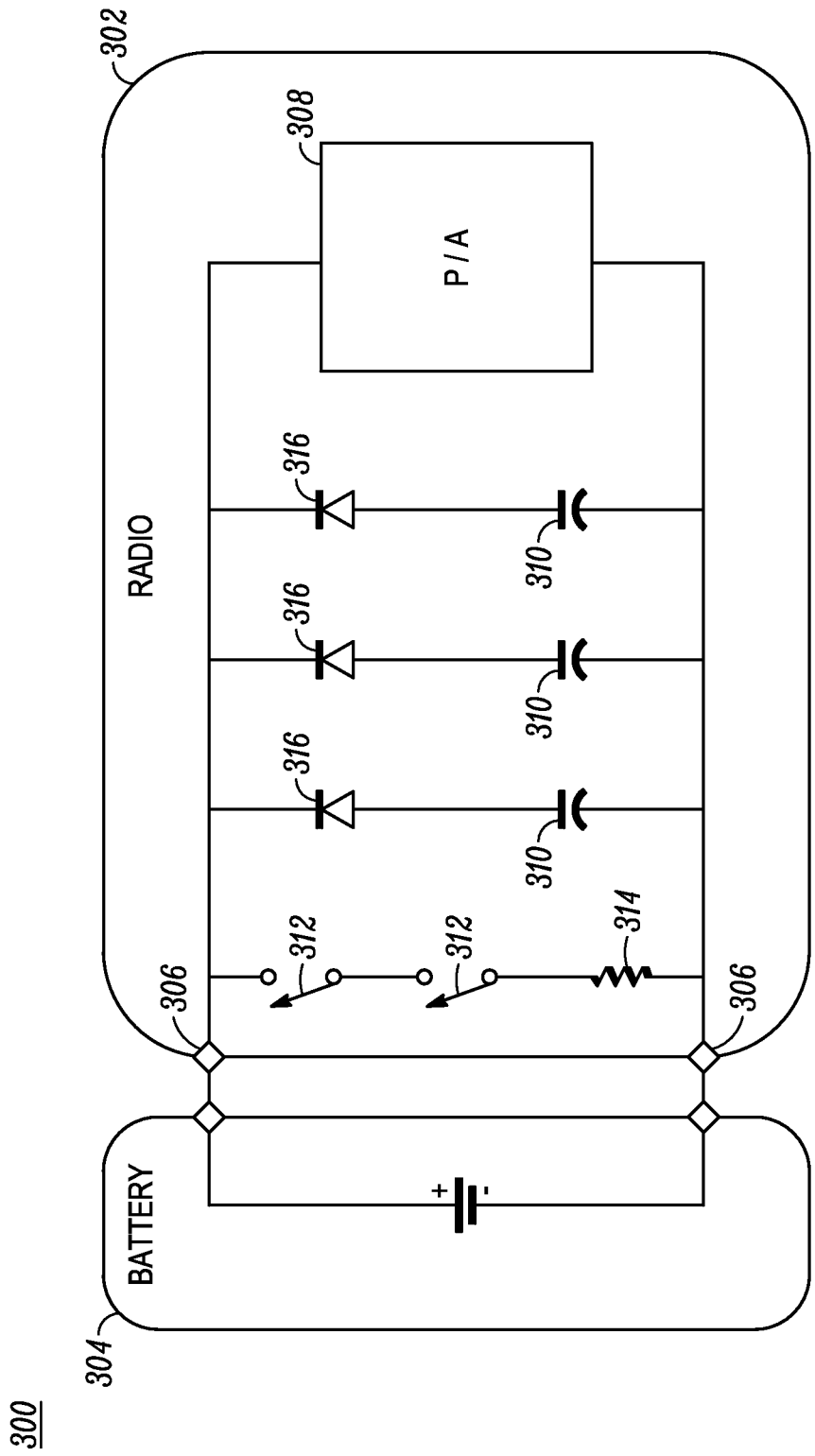
FIG. 3 is a communication device in accordance with various embodiments of the invention.

FIG. 3 shows a block diagram of a communication device 300 in accordance with another embodiment of the invention. Like the communication devices of FIGS. 1 and 2, communication device 300 comprises a radio 302 and a battery 304 coupled to the radio via radio contacts 306. The radio 302 includes known transceiver and controller circuitry, but for the purposes of this application only transmit power amplifier 308 is shown. In this embodiment, a plurality of parallel coupled capacitors 310, each capacitor having a series coupled diode, are coupled across the supply and GND lines. The use of the diodes 316 provides for isolation of circuitry of dissimilar voltages. Discharge resistor 314 provides a discharge path between supply and GND when the series coupled switches 312 are closed. In this embodiment, the plurality of switches 312 comprise series coupled cam operated mechanical switches which close in response to the battery 304 being removed from the radio 302 to dissipate energy from the plurality of capacitors 310 through discharge resistor 314. While shown with two switches 312 for redundancy, one switch could also be used or more than two switches coupled be used depending on the application.

Figure 4:
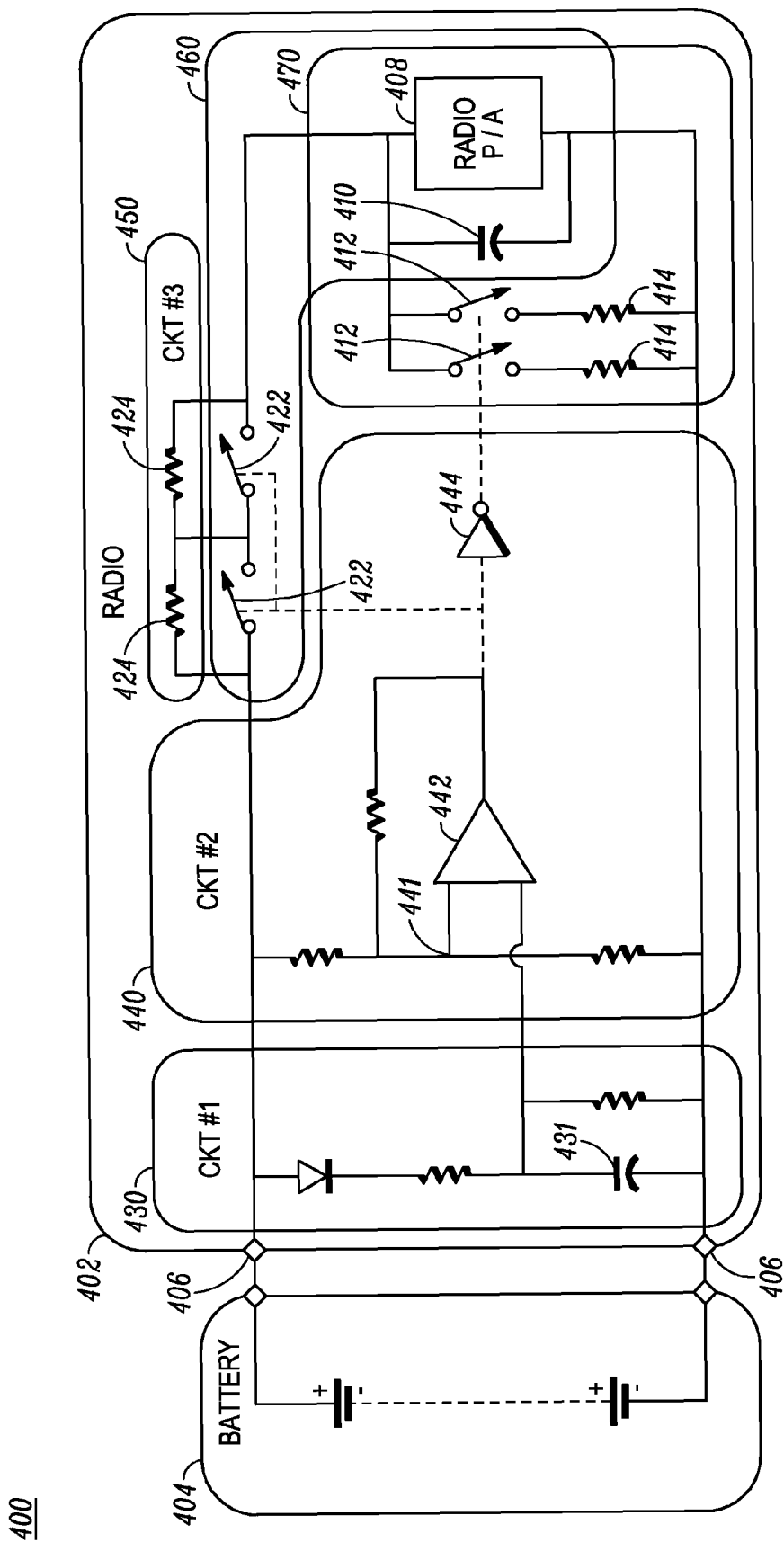
FIG. 4 is a communication device in accordance with various embodiments of the invention.

FIG. 4 shows a block diagram of a communication device 400 in accordance with another embodiment of the invention. Like the communication devices of FIGS. 1, 2 and 3, communication device 400 comprises a radio 402 and a battery 404 coupled to the radio via radio contacts 406. The radio 402 includes known transceiver and controller circuitry, but for the purposes of this application only transmit power amplifier 408 is shown. In this embodiment, at least one capacitor 410 is coupled across the PA supply lines. This embodiment further includes first and second sensing circuits 430, 440 respectively, inrush current limiting circuit 450, and first and second switching circuits 460, 470 respectively. The first sensing circuit 430 is coupled to the radio contacts 406 and to the second sensing circuit 440. The second sensing circuit 440 is coupled to the first and second switching circuits 460, 470.

The first sensing circuit 430 may be formed of a diode, voltage divider and capacitor (or similar configuration) to provide a predetermined time constant for the voltage going into the second sensing circuit 470. At the time that the battery 404 is removed from the radio 402, the differential voltage resulting from the voltage across storage capacitor 431 and the voltage at the voltage divider 441 causes the output of the comparator 442 to change output state. The residual voltage stored in capacitor 410 and the time constant of sense circuit 430 keeps the comparator 442 in this state until the voltage in capacitor 410 is dissipated.

The second sensing circuit 440 includes a comparator 442 with resistor and capacitor biasing circuitry to set a predetermined comparator threshold and an inverter 444. The output of the comparator 442 controls first switching circuit switches 422. The output of the inverter 444 controls second switching circuit switches 412.

In this embodiment, the first and second switching circuit switches 412 and 422 comprise a plurality of electrical switches, such as transistor switches, which close and open in response to the sensing circuitry 430, 440 detecting removal of the battery from the radio and attachment of the battery to the radio.

Upon removal of the battery 404 for the radio 402, the first switching circuit 460 opens switches 422 to remove access to the stored energy of capacitor 410 from the contacts 406. Also upon removal of the battery, the second switching circuit 470 closes switches 412 to dissipate the stored energy from capacitor 410 through resistors 414. The embodiment of FIG. 4 provides the additional advantage of current limiting the inrush of current during attachment of the battery to the radio through inrush current limiting resistors 424 while the switches are open.

Prior to attachment of the battery 404 to the radio 402, the first switching circuit switches 422 are open and the second switching circuit switches 412 are also open.

Upon attachment of the battery 404 to the radio 402, the time constant associated with the first sensing circuit 430 maintains the output of the comparator 442 to hold the first switching circuit switches 422 open allowing current to flow from the battery 404 through resistors 424 to the PA 408. The inrush current limiting resistors 424 are selected to be large enough so that the current remains low enough to prevent sparking during this initial attachment phase.

Once the comparator threshold has been reached within the second sensing circuit 440, the first switching circuit switches 422 close and the inrush current limiting resistors 424 are bypassed. The second switching circuit switches remain open and full power is supplied to the PA 408.

Upon removal of the battery 404 from the radio 402, the time constant associated with the first sensing circuit 430 and the comparator threshold of the second sensing circuit 440 causes the first switching circuit switches 422 to open thereby isolating capacitor 410 from radio contacts 406. The inrush current limiting resistors 424 are of no significance in this condition. Upon removal of the battery 404, the output of inverter 444 closes the second switching circuit switches 412 thereby discharging the stored charge from capacitor 410 through resistors 414. The residual voltage stored in capacitor 410 and the time constant of sense circuit 430 keeps the comparator 442 in this state until the voltage in capacitor 410 is dissipated.

While the embodiments have been discussed in terms of cam operated mechanical switches and electrical transistor switches, a variety of other switches may be also be utilized such as Hall Effect switches, optical switches to name a few, without departing from the scope of the invention.

Figure 5:
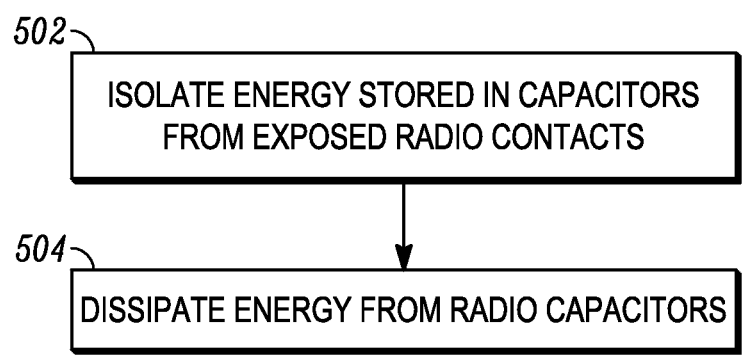
FIG. 5 is a flow chart of a method for intrinsic safety operation of a communication device in accordance with various embodiments of the invention.

FIG. 5 provides a flowchart summarizing the embodiments to prevent sparking as a battery is removed from a radio. Method 500 includes performing at least one of isolating energy stored in radio capacitors from exposed radio contacts 502 and/or dissipating energy from the radio capacitors 504. By switching a plurality of switches within the radio, and or using switcheably coupled resistors, intrinsically safe battery removal and attachment can be achieved in which sparking at the radio contacts is prevented—even if an inadvertent short occurs across the contacts 406.

Accordingly, there has been provided an intrinsically safe communication device in which sparking is prevented at the radio contacts during attachment and removal of the battery from the radio. The manner in which intrinsic safety is achieved also limits inrush current during attachment of the battery. Unlike past approaches, the intrinsic safety approach provided by the various embodiments requires no change to the battery and eliminates the need for series diodes in the radio and further avoids the use of complex circuitry.

Past approaches to intrinsic safety have utilized diodes in the radio to discharge the radio current, causing significant battery energy loss. For example, the use of diodes in the radio may impose a voltage drop between 0.3 Volts and 0.6 Volts per diode. Past intrinsically safe applications have typically used two diodes in series. The voltage drop associated with two series diodes significantly decreases the effective capacity and available power of the battery, particularly in single-cell applications where the battery voltage is only 3-4 Volts accounting for as much as a 40% loss in battery power. The power dissipated in the diodes also adds heat to the radio. The intrinsic safety approach provided by the various embodiments requires no series diodes.

Other past intrinsic safety designs have used complex circuitry in the battery to effect the necessary speed of operation and limit the energy out of the battery. Large components have previously been needed in the battery to handle the inherent power dissipation affecting the physical size of the battery. These additional components also added series voltage drops within the battery affecting the available battery capacity. The intrinsic safety approach provided by the various embodiments does not require the addition of complex circuitry to the battery.

Other past approaches to intrinsic safety have relied on the use of radio inrush current protection to be resident in the battery. The intrinsic safety approach provided by the various embodiments requires no changes to the battery.

Accordingly, a communication device having the intrinsic safety embodiments is prevented from sparking even if a possible short circuit discharge condition on the exposed radio contacts occurs.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A communication device, comprising:
a radio having a radio capacitor and radio contacts, wherein the radio capacitor is coupled across the radio contacts;
a battery coupled to the radio via the radio contacts;
a first sensing circuit with a predetermined time constant coupled to the radio contacts;
a second sensing circuit coupled to the first sensing circuit, wherein the second sensing circuit includes a comparator with a predetermined comparator threshold and an inverter;
a first switching circuit coupled to the second sensing circuit, wherein the first switching circuit comprises first switching circuit switches that open in response to removal of the battery from the radio to remove access to the stored energy of the radio capacitor from the radio contacts; wherein the time constant of the first sensing circuit and the comparator threshold of the second sensing circuit causes the first switching circuit switches to open; and
a second switching circuit coupled to the second sensing circuit, wherein the second switching circuit comprises second switching circuit switches that close in response to removal of the battery from the radio to dissipate the stored energy of the radio capacitor; wherein output from the inverter of the second sensing circuit causes the second switching circuit switches to close.

2. The communication device of claim 1, wherein upon attachment of the battery to the radio the predetermined time constant of the first sensing circuit holds the first switching circuit switches open until the predetermined comparator threshold in the second sensing circuit is reached, and the first switching circuit switches being closed in response to the predetermined comparator threshold being reached.

3. The communication device of claim 1, further comprising current limiting inrush resistors which limit radio current when the first switching circuit switches are open during the predetermined time constant associated with the first sensing circuit upon attachment of the battery to the radio.

4. The communication device of claim 2, wherein the first switching circuit switches are open and the second switching circuit switches are open prior to attachment of the radio to the battery.

* * * * *